Figures 1, 2:
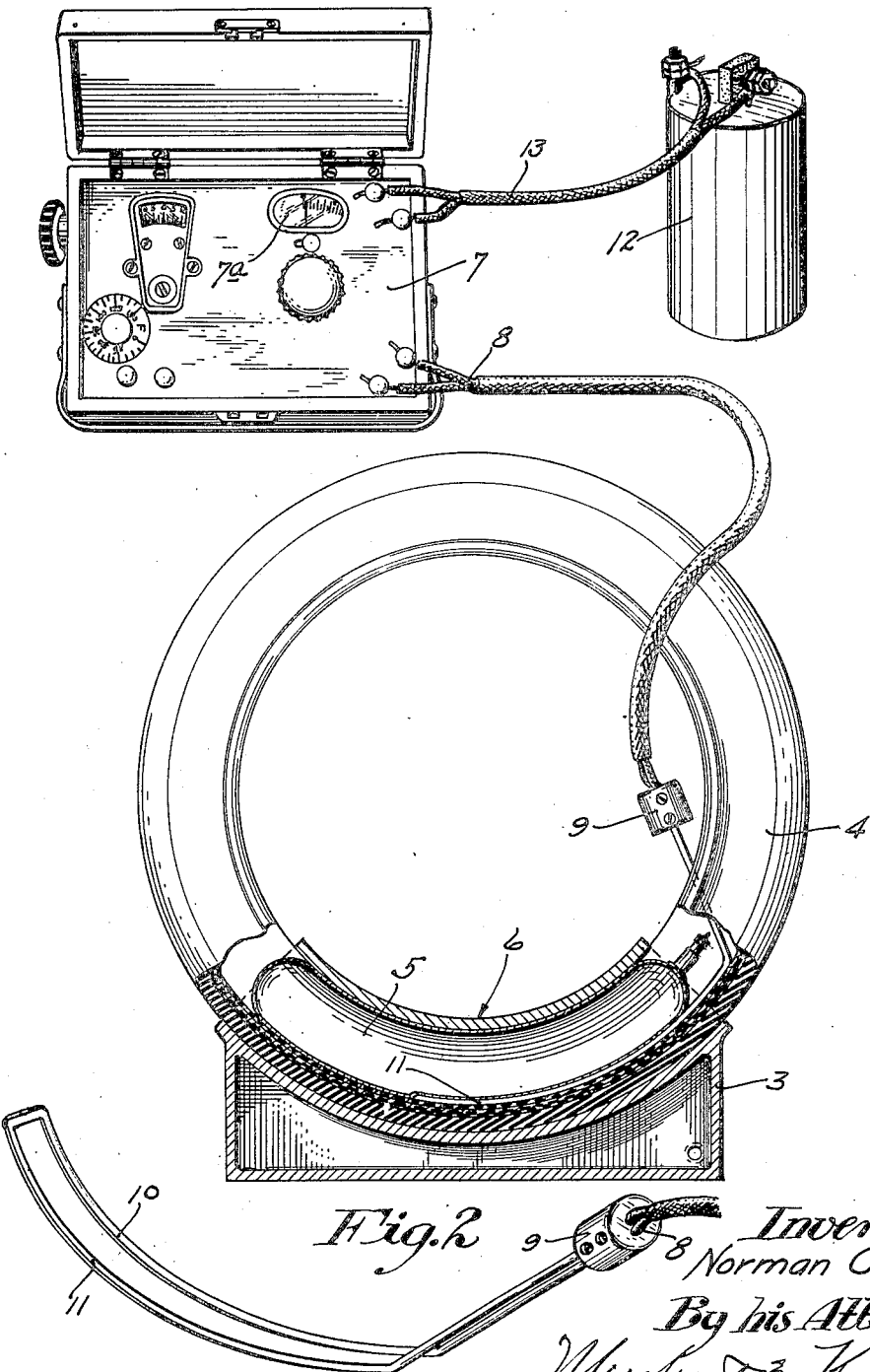

Aug. 7, 1923.

N. CONN 1,463,872

TEMPERATURE INDICATING APPARATUS FOR TIRE VULCANIZATION

Filed March 30, 1922

Inventor
Norman Conn
By his Attorneys

Patented Aug. 7, 1923.

1,463,872

UNITED STATES PATENT OFFICE.

NORMAN CONN, OF MINNEAPOLIS, MINNESOTA.

TEMPERATURE-INDICATING APPARATUS FOR TIRE VULCANIZATION.

Application filed March 30, 1922. Serial No. 548,161.

*To all whom it may concern:*

Be it known that I, NORMAN CONN, a citizen of the United States, residing at Minneapolis, in the county of Hennepin and State of Minnesota, have invented certain new and useful Improvements in Temperature-Indicating Apparatus for Tire Vulcanization; and I do hereby declare the following to be a full, clear, and exact description of the invention, such as will enable others skilled in the art to which it appertains to make and use the same.

My invention relates to the vulcanization of pneumatic tire casings and is especially serviceable in the vulcanization of large sized casings. The greatest cause of unsatisfactory repairs in pneumatic tire casings and, in fact, also in new or factory-produced casings, is poor or incomplete vulcanization in the inner surface thereof. In the standard method of vulcanizing tire casings, they are placed in steam-heated molds or forms against which they are pressed by internal cores, such as expansible air or steam bags, and the operator has found it necessary to estimate or guess at the proper time required for each particular casing to accomplish the proper heat penetration and resulting vulcanization. To accomplish the proper vulcanization, it is necessary that the inner portions of the casing be heated to certain predetermined temperatures and maintained at that temperature for certain predetermined times, but hitherto, no means has been provided whereby such results could be accomplished with any even approximate degree of certainty, so that, almost universally, the work done has been bad and generally unsatisfactory.

My invention provides an extremely simple means for accurately indicating the temperature of the inner surface of the tire casing and for determining when the same has been maintained at such temperature for the proper length of time.

In carrying out my invention, I utilize a thermocouple of such form and arrangement that it may be pressed against the inner surface of the tire casing by an expansible core or air or steam bag. This thermocouple is, by a suitable circuit, connected to an electrical instrument that responds to the current thermally induced in the thermocouple and produces a reading or indication in degrees of temperature indicating the temperature that is produced at the inner surface of the tire casing. The instrument for giving the above reading in degrees may be a so-called "potentiometer" indicator, such as sold to the trade by the Leeds & Northrup Company, of Philadelphia, Pennsylvania, and which instrument is well known to the trade. The said instrument has an indicator, which, when connected to a thermocouple, will indicate in degrees of temperature the temperature applied to the thermocouple and which induces the electric current in the thermocouple and in the circuit connections to said indicator.

In the accompanying drawings, which illustrate the invention, like characters indicate like parts throughout the several views.

Referring to the drawings:

Fig. 1 is a view partly in elevation, partly in section and partly in perspective, showing the complete temperature indicating apparatus; and Fig. 2 is a perspective of the thermocouple used as a part of the apparatus.

The numeral 3 indicates a steam-heated mold or form having a segmental channel within which the outer surface of the tire casing 4 is seated. The numeral 5 indicates the core in the form of an expansible air bag. The numeral 6 indicates the removable segmental sections of the form.

The numeral 7 indicates the casing of a potentiometer indicator of the Leeds & Northrup type, the same having an electrically actuated indicator 7ᵃ with extended lead wires 8 that are connected by a coupling 9 to the wires 10 and 11 of the thermocouple. The wires 10—11 of the thermocouple are of different metals; the wire 10 may be assumed to be of iron and the wire 11 a composition of metals other than iron. Preferably, the two wires 10 and 11 are flattened and both are curved so that they are close to the circumferential curvature of the interior of the tire casing 4 and, hence, will fit snugly between the interior of said casing and the bag or core 5. The ends of the wires 10 and 11 are bent so that they extend through the opening in the tire casing and can therefore be readily connected to the lead wires 8. The numeral 12 indicates a battery connected by leads 13 to certain parts of the apparatus within the casing 7.

The construction of the potentiometer indicator above noted is well known to those familiar with the art and need not here be considered further than to state that the indicator 7ª is of such character that, when operated by a current thermally induced in the thermocouple, it will indicate in degrees of temperature, preferably Fahrenheit, the temperature acting upon the thermocouple to induce such current. Hence, when the thermocouple is applied as shown in the drawings and heat is applied to the mold at the exterior of the tire casing, the heat will be transmitted through the tire casing, to the inner surface thereof and the operator, by watching the indicators 7ª, can, at all times, determine the exact temperature that is being applied to the inner surface of the tire casing.

A little experimentation will determine the amount of heat and the proper time of application required for the proper vulcanization of a tire of any certain size, and such data being determined and tabulated, this improved apparatus affords means thereafter for definitely producing or regulating the proper and complete vulcanization of such tire casings.

In actual practice, this apparatus has been found efficient for all of the purposes had in view and it has been made an easy matter to produce universal or proper predetermined vulcanization to tire casings with little or no possibility of mistake, whereas, under previous methods of operation, the matter has been simply guess work, resulting in very poor vulcanization and frequent failure in vulcanization such as will produce any good results in making tire repairs. The apparatus is especially required for large tire casings, but it will be found convenient and desirable even for the repair of small tire casings.

What I claim is:

1. The combination with a thermally heated mold adapted to receive a tire casing, and an expansible core adapted to press said tire casing against the heated surface of said mold, of a temperature indicating apparatus comprising a curved thermocouple fitted between said core and the inner surface of the tire casing, and an electric circuit including said thermocouple and a temperature indicator.

2. The combination with a thermally heated mold adapted to receive a tire casing, and an expansible core adapted to press said tire casing against the heated surface of said mold, of a temperature indicating apparatus comprising a curved thermocouple fitted between said core and the inner surface of the tire casing, and an electric circuit including said thermocouple and a temperature indicator, said temperature indicator being subject to the current thermally induced in said thermocouple and being constructed and arranged to indicate in degrees of temperature the temperature applied to said thermocouple at the interior of the tire casing.

3. The combination with a thermally heated mold adapted to receive a tire casing, and an expansible core adapted to press said tire casing against the heated surface of said mold, of a temperature indicating apparatus comprising a thermocouple curved to fit between the said core and the inner surface of the tire casing when extended circumferentially thereof, the ends of the thermocouple wires being inwardly bent so as to pass through the opening in said tire casing, and an electric circuit including said thermocouple and a temperature indicator, said temperature indicator being subject to the current thermally induced in said thermocouple and being constructed and arranged to indicate the temperature applied to said thermocouple at the interior of the tire casing.

4. The combination with means for vulcanizing a tire casing, of a temperature indicator applied to the inner portion of the tire casing and extended to the exterior thereof so that temperatures taking place during vulcanization may be noted.

In testimony whereof I affix my signature.

NORMAN CONN.